United States Patent Office 3,674,496

Patented July 4, 1972

3,674,496

NEGATIVE LIGHT-SENSITIVE MATERIAL

Jury Sergeevich Bokov, K-482, korpus 338a, kv. 61; Ninel Vladimirovna Vikulina, K-482, korpus 505, kv. 57; Boris Aristarkhovich Dogadkin, Ulitsa Schukina 8/1, kv. 25; Boris Vasilievich Erofeev, Khlebny pereulok 9, kv. 26; Anastasia Vasilievna Larina, K-460, korpus 229, kv. 4; Vadim Petrovich Lavrischev, Ploschad Junosti 4, kv. 22; and Vladimir Vladimirovich Markov, Bolotnikovskaya ulitsa 42, korpus 3, kv. 88, all of Moscow, U.S.S.R.; Sofia Fadeevna Naumova, Tipografskaya ulitsa 3, kv. 69; and Olga Demidovna Jurina, Ulitsa V. Khoruzhaya 33, kv. 80, both of Minsk, U.S.S.R.; and Galina Dmitrievna Yarovaya, K-460, korpus 216, kv. 14, Moscow, U.S.S.R.

No Drawing. Filed Jan. 16, 1970, Ser. No. 3,481
Claims priority, application U.S.S.R., Apr. 11, 1968, 1,231,856
Int. Cl. G03c *1/52*
U.S. Cl. 96—91 N 5 Claims

ABSTRACT OF THE DISCLOSURE

A negative light-sensitive material comprising a polymer base which is polycyclohexadiene-1,3 or a copolymer of cyclohexadiene-1,3 with diene hydrocarbons, an organic solvent and a light-sensitive additive of the type of bisazides.

The present invention relates to negative light-sensitive materials employed in photolithographic techniques for producing various articles pertaining to the electronic, radio-engineering and polygraphic arts industry, such as printed circuit boards or cards, thin-film microcircuits, cliches, and the like.

Known in the art are light-sensitive materials based on modified rubbers and comprising organic solvents, as well as light-sensitive additives. Thus, for example, a light-sensitive material is known, which comprises, as a base, 100 parts by weight of cyclorubber obtained by modifying natural or synthetic rubber in a phenol medium in the presence of an acid catalyst, and 2–10 parts by weight of a light-sensitive additive, such as 4,4′-diazidochalcone or 2,6-di-(4′-azidobenzal)-4-methylhexanone. Light-sensitive additives of the type of "bisazides" are widely used in light-sensitive materials such as described in the following publications:

(1) M.S. Dinaburg. "Light-sensitive Diazo-compounds and Their Applications," Moscow, 1966.

(2) T. Tsundoda, J. Appl. Pol. Sci." 8, No. 379 (1964).

(3) Solid State Technology, June 1970, 39. Richard L. Bersin. International Plasma Corp., Hayward, California.

(4) U.S. Pat. No. 2,852,379; Sept. 16, 1958.

(5) British Pat. No. 901,735; July 25, 1962.

(6) Japanese Pat. No. 1,134; Mar. 5, 1959.

(7) U.S. Pat. No. 2,940,853; June 14, 1960.

A mixture of toluene with xylene is used as a solvent.

Said light-sensitive materials feature insufficiently high resolving power, so that with their use separate lines only with a width not less than 30 mu can be reproduced, which fact makes the scope of application of these materials considerably limited. The known light-sensitive materials are not stable with respect to their physical properties, this being due to the use of cyclorubber as the base, the properties of the latter varying depending on the kind of natural rubber taken for the stock.

The object of the present invention is to provide a negative light-sensitive material which will feature stable properties and high resolving power.

Said object is accomplished by providing a negative light-sensitive material comprising a polymer base, organic solvents and light-sensitive additives, according to the invention, wherein polycyclohexadiene-1,3 or a copolymer of cyclohexadiene-1,3 with diene hydrocarbons is used as said polymer base.

As said copolymer the present negative light-sensitive material preferably comprises a copolymer of cyclohexadiene-1,3 with butadiene-1,3, or a copolymer of cyclohexadiene-1,3 with 2-methylbutadiene-1,3.

The negative light-sensitive material of the present invention comprises components taken in the following amounts (wt. percent):

| | |
|---|---|
| Polycyclohexadiene-1,3, or a copolymer of cyclohexadiene-1,3 with diene hydrocarbons | 5–30 |
| Light-sensitive additives of the type of bisazides | 0.05–3.0 |
| Organic solvent | up to 100 |

It is preferable to use the following composition of the negative light-sensitive material (the components being specified in wt. percent):

| | |
|---|---|
| Polycyclohexadiene-1,3, or a copolymer of cyclohexadiene-1,3 with butadiene-1,3, or a copolymer of cyclohexadiene-1,3 with 2-methylbutadiene-1,3 | 15–20 |
| 2,6 - di - (4′ - azidobenzal)-4-methylcyclohexanone or 4,4′-diazidochalcone | 0.3–0.6 |
| Xylene or toluene | up to 100 |

The present light-sensitive material is prepared and applied as follows.

A polymer base, for which purpose use is made of polycyclohexadiene-1,3 or a copolymer of cyclohexadiene-1,3 and diene hydrocarbons (butadiene-1,3, 2-methylbutadiene-1,3, or the like), is dissolved in organic solvents, such as xylene, toluene, benzene, or the like. Then into the obtained solution a light-sensitive additive is introduced, this additive being of the type of bisazides (2,6-di-(4′-azidobenzal)-4-methylcyclohexanone, or 4,4′-diazidochalcone, or 4,4′-diazido (dibenzal)-acetone).

The dissolution of the polymer base and light-sensitive additive is carried out at room temperature. Then the resulting solution is applied onto a carrier, e.g., onto a copper plate. After the removal of the solvent, which is done by drying at a temperature of 80–100° C., 1–3 mu thick film is formed on the carrier. The film is subjected to ultraviolet radiation through a photographic master pattern, the illumination being from 10 to 15 thousand luxes, at a distance of 270 mm. for 7 minutes. In the irradiated places photochemical processes take place which change the solubility of the light-sensitive material. Therefore in the course of subsequent treatment with the solvent those portions which have not been irradiated are removed from the carrier. Then the carrier is dried at a temperature of 80–100° C., and on the carrier surface a relief layer of the light-sensitive material is formed, said layer serving as a protection when the carrier is etched. After etching of the carrier and the removal of the light-sensitive material a circuit pattern is obtained on the carrier.

The negative light-sensitive material proposed herein is noted for high adhesion, chemical stability and improved resolving power.

The present material makes it possible to reproduce separate lines 5–10 mu wide. On the average the resolving power of the proposed material amounts to 7 mu with the film thickness of 2 mu and the width of the development wedge equal to 2 mu.

The improved properties and enhanced resolving power of the present light-sensitive material are due to the fact, that the employed polymers based on cyclohexadiene-1,3 have a high adhesion with respect to different materials, and a high chemical stability. Moreover, when being dissolved, they swell only to a very insignificant extent, which is instrumental for high accuracy and resolving power with which the geometry of the pattern elements are reproduced.

For a better understanding of the present invention given hereinbelow are illustrative examples thereof.

EXAMPLE 1

100 g. of polycyclohexadiene-1,3 (molecular weight 5129, iodine number 290 and viscosity/$\eta$/=0.25) are disolved in a mixture consisting of 100 ml. of xylene and 300 ml. of toluene, and 2 g. of 2,6-di-(4'-azidobenzal)-4-methylcyclohexanone are introduced into the solution. The resulting mixture comprises the following amounts of components (in wt. percent):

| | |
|---|---|
| Polycyclohexadiene-1,3 | 22.3 |
| Toluene | 19.2 |
| Xylene | 58.06 |
| 2,6-di-(4'-azidobenzal)-4-methylcyclohexanone | 0.44 |

The solution is applied onto a silicon plate. After the removal of the solvent by drying at a temperature of 80–100° C., a 1 mu thick film is formed on the carrier. The film is irradiated through a photographic master pattern with ultraviolet light, the illumination being equal to 10,000 luxes, as a distance of 270 mm. for 7 minutes. The resulting image is treated with xylene, to remove those portions which have not been irradiated. A circuit element 7 mu wide is obtained. Then the plate is dried at a temperature of 170° C. during 15 minutes and placed in a solution of HF and $HNO_3$ taken in a ratio of 1:7 for etching the silicon to the depth of 50 mu.

EXAMPLE 2

100 g. of a copolymer of cyclohexadiene-1,3 with 2-methylbutadiene-1,3, the molar ratio of the monomers being 1:0.1, the iodine number of the copolymer being 270 and viscosity/$\eta$/=0.18, are dissolved in a mixture consisting of 250 ml. of xylene and 250 ml. of toluene, and 4,4'-diazidochalcone is introduced into the solution in an amount of 2 g. The result is a mixture with the following composition (in wt. percent):

| | |
|---|---|
| Copolymer of cyclohexadiene-1,3 with 2-methylbutadiene-1,3 | 18.7 |
| Xylene and toluene | 80.93 |
| 4,4'-diazidochalcone | 0.37 |

Further the process of application of the light-sensitive material is effected as described in Example 1.

EXAMPLE 3

100 g. of a coplymer of cyclohexadiene-1,3 with 2-methylbutadiene-1,3, taken in a molar ratio of 1:0.2, the iodine number of the copolymer being 290 and viscosity/$\eta$/=0.19 are dissolved in a mixture of 250 g. of xylene and 250 g. of toluene, whereupon 7 g. of 4,4'-diazidochalcone are introduced into the solution. The resulting mixture comprises (in wt. percent):

| | |
|---|---|
| Copolymer of cyclohexadiene-1,3 with 2-methylbutadiene-1,3 | 18.5 |
| Xylene and toluene | 80.2 |
| 4,4'-diazidochalcone | 1.3 |

Further the process of application of the light-sensitive material is carried out as described in Example 1.

EXAMPLE 4

100 g. of a copolymer of cyclohexabutadiene-1,3 with butadiene-1,3, which are taken in a molar ratio of 1:0.2, the iodine number of the copolymer being 267 and viscosity/$\eta$/=0.295, are dissolved in 600 ml. of p-xylene, after which 2.5 g. of 2,6-di-(4'-azidobenzal)-4-methylcyclohexanone are introduced into the solution.

The resulting mixture comprises (in wt. percent):

| | |
|---|---|
| Copolymer of cyclohexadiene-1,3 with butadiene-1,3 | 16.1 |
| p-Xylene | 83.5 |
| 2,6-di-(4'-azidobenzal)-4-methylcyclohexanone | 0.4 |

The obtained solution is applied onto a copper plate, and the further steps of drying, irradiation with ultraviolet light and treating with the solvent are carried out as described in Example 1.

What is claimed is:

1. A negative light-sensitive material, consisting of a polymer base selected from the group comprising polycyclohexadiene-1,3 and a copolymer of cyclohexadiene-1,3 with diene hydrocarbons, an organic solvent and a light-sensitive additive of the type of bisazides.

2. A negative light-sensitive material as claimed in claim 1, wherein the polymer base is a copolymer of cyclohexadiene-1,3 with butadiene-1,3.

3. A negative light-sensitive material as claimed in claim 1, wherein the polymer base is a copolymer of cyclohexadiene-1,3 with 2-methylbutadiene-1,3.

4. A negative light-sensitive material as claimed in claim 1, which comprises components taken in the following weight percent:

| | |
|---|---|
| Polymer base selected from the group consisting of polycyclohexadiene-1,3 and a copolymer of cyclohexadiene-1,3 with diene hydrocarbons | 5–30 |
| Light-sensitive additive of the type of bisazides | 0.05–3.0 |
| Organic solvent | balance |

5. A negative light-sensitive material as claimed in claim 4, which comprises components taken in the following weight percent:

| | |
|---|---|
| Polymer base selected from the group consisting of polycyclohexadiene-1,3, a copolymer of cyclohexadiene-1,3 with butadiene-1,3 and a copolymer of cyclohexadiene-1,3 with 2-methylbutadiene-1,3 | 15–20 |
| Light-sensitive additive selected from the group consisting of 2,6-di-(4'-azidobenzal)-4-methylcyclohexanone and 4,4'-diazidochalcone | 0.3–0.6 |
| Organic solvent selected from the group consisting of xylene and toluene | up to 100 |

References Cited

UNITED STATES PATENTS

| | | | |
|---|---|---|---|
| 2,940,853 | 6/1960 | Sagura et al. | 96—91 N |
| 3,278,305 | 10/1966 | Laridon et al. | 96—91 N |

FOREIGN PATENTS

| | | | |
|---|---|---|---|
| 901,735 | 7/1962 | Great Britain | 96—91 |
| 763,288 | 12/1956 | Great Britain | 96—91 |

NORMAN G. TORCHIN, Primary Examiner

J. L. GOODROW, Assistant Examiner

U.S. Cl. X.R.

96—76